United States Patent
Monaghan et al.

(10) Patent No.: US 9,119,035 B2
(45) Date of Patent: Aug. 25, 2015

(54) LOCATION-BASED POWER MANAGEMENT FOR VIRTUAL DESKTOP ENVIRONMENTS

(75) Inventors: John Monaghan, Scotland (GB); Michael A. Dews, Longmont, CO (US); Subhasri Dhesikan, San Jose, CA (US); Manish S. Mittal, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 217 days.

(21) Appl. No.: 13/477,299

(22) Filed: May 22, 2012

(65) Prior Publication Data
US 2013/0318521 A1 Nov. 28, 2013

(51) Int. Cl.
G06F 9/46 (2006.01)
H04W 4/02 (2009.01)
H04L 29/06 (2006.01)
H04W 12/08 (2009.01)
H04L 12/64 (2006.01)

(52) U.S. Cl.
CPC ........... *H04W 4/023* (2013.01); *H04L 12/6418* (2013.01); *H04L 63/107* (2013.01); *H04W 12/08* (2013.01)

(58) Field of Classification Search
CPC ...... G06F 9/45533; G06F 9/50; H04W 4/023; H04W 12/08; H04L 63/107; H04L 12/6418
USPC ..................................................... 718/1, 104
See application file for complete search history.

(56) References Cited

U.S. PATENT DOCUMENTS

| | | | | |
|---|---|---|---|---|
| 5,675,810 | A * | 10/1997 | Sellers | 713/323 |
| 6,330,676 | B1 * | 12/2001 | Kelsey | 726/7 |
| 8,326,793 | B1 * | 12/2012 | Bowers et al. | 706/62 |
| 8,614,431 | B2 * | 12/2013 | Huppi et al. | 250/559.36 |
| 8,694,702 | B2 * | 4/2014 | McCarthy et al. | 710/64 |
| 2003/0188154 | A1 | 10/2003 | Dallard et al. | |
| 2006/0218301 | A1 | 9/2006 | O'Toole et al. | |
| 2006/0294388 | A1 * | 12/2006 | Abraham et al. | 713/182 |
| 2009/0009648 | A1 * | 1/2009 | Huang | 348/333.01 |
| 2011/0131330 | A1 | 6/2011 | Beaty et al. | |
| 2012/0131229 | A1 * | 5/2012 | McCarthy et al. | 710/5 |
| 2012/0131662 | A1 | 5/2012 | Kuik et al. | |
| 2012/0159483 | A1 * | 6/2012 | He et al. | 718/1 |
| 2012/0233549 | A1 * | 9/2012 | Ricci | 715/740 |
| 2012/0317295 | A1 | 12/2012 | Baird et al. | |

(Continued)

FOREIGN PATENT DOCUMENTS

WO WO-2011099969 A1 8/2011

OTHER PUBLICATIONS

"NightWatchman® Server Edition: Redefines Server Efficiency", 1E Product Sheet, www.1e.com/nightwatchserver, (2011), 2 pages.

(Continued)

*Primary Examiner* — Emerson Puente
*Assistant Examiner* — Willy W Huaracha
(74) *Attorney, Agent, or Firm* — Parker Ibrahim & Berg LLC; James M. Behmke; Stephen D. LeBarron (57) ABSTRACT

In one embodiment, an illustrative technique determines when an end-user is within a specified proximity of a client device configured to provide an interface to a virtual machine. In response to the end-user being within the specified proximity of the client device, the technique may then allocate data center resources for the virtual machine.

17 Claims, 6 Drawing Sheets (56) References Cited

U.S. PATENT DOCUMENTS

2013/0007737 A1\* 1/2013 Oh et al. .......................... 718/1
2013/0018999 A1 1/2013 Merrill et al.

OTHER PUBLICATIONS

"NightWatchman® Server Edition: True Business Value from Every Kilowatt You Use", 1E Product Page, www.1e.com, (2011), 2 pages.

"VMware® Distributed Power Management Concepts and Use: VMware ESX 3/5 and VMware vCenter Server 2.5", Information Guide, VMware, Inc., Palo Alto, Calif., (2009), 12 pages.

"vSphere Resource Management Guide: ESX 4.0, ESXi 4.0, vCenter Server 4.0", VMware, Inc., Palo Alto, Calif., (2011), 106 pages.

Sogno-Pabis, et al., "Notification of Trasmittal of the International Search Report and the Written Opinion of the International Searching Authority, or the Declaration", Patent Cooperation Treaty, International Application No. PCT/US2013/042219, mailed Nov. 21, 2013, 10 pages, European Patent Office, Rijswijk, Netherlands.

\* cited by examiner

LOCATION-BASED POWER MANAGEMENT FOR VIRTUAL DESKTOP ENVIRONMENTS

TECHNICAL FIELD

The present disclosure relates generally to computer networks, and, more particularly, to virtual desktop environments.

BACKGROUND

In a virtual desktop environment, an end-user, via a client device, accesses data resources, which may be collectively aggregated in a "virtual machine" container, remotely located from the client device. That is, the virtual machine may reside in a data center and is transmitted to the client device, e.g., an end-point, via various virtual machine models such as hosted desktops, application streaming, desktop streaming, etc. In this fashion, the client device can be a "thin-client" or "zero-client", as will be understood by those skilled in the art.

Although power can be conserved via thin-clients or zero-clients with lower computing capacities, more power is expended in data centers that house the virtual machine. Thus, despite efforts to date, for example, PoE (Power over Ethernet), DRS (dynamic resource schedulers), DPM (distributed power management), etc., there remain opportunities to optimize power consumption. As such, reducing net power consumption for virtual desktop environments has proven problematic.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an illustrative technique determines when an end-user is within a specified proximity of a client device configured to provide an interface to a virtual machine. In response to the end-user being within the specified proximity of the client device, the technique may then allocate data center resources for the virtual machine.

Description

Virtual desktop environments typically comprise data centers housing data resources, resource management devices, and client devices, each of which are typically interconnected via a computer network. A computer network that comprises geographically distributed nodes (e.g., data centers and client devices) interconnected by communication links and segments for transporting data between end nodes. Various types of network are available and can include, for example, local area networks (LANs), wide area networks (WANs), etc. Each of these networks can connect the nodes over dedicated private communication links, or dispersed nodes over long-distance communications links such as common carrier telephone lines, optical lightpaths, synchronous optical networks (SONET), synchronous digital hierarchy (SDH) links, or Powerline Communications (PLC), and others.

Figure 1:
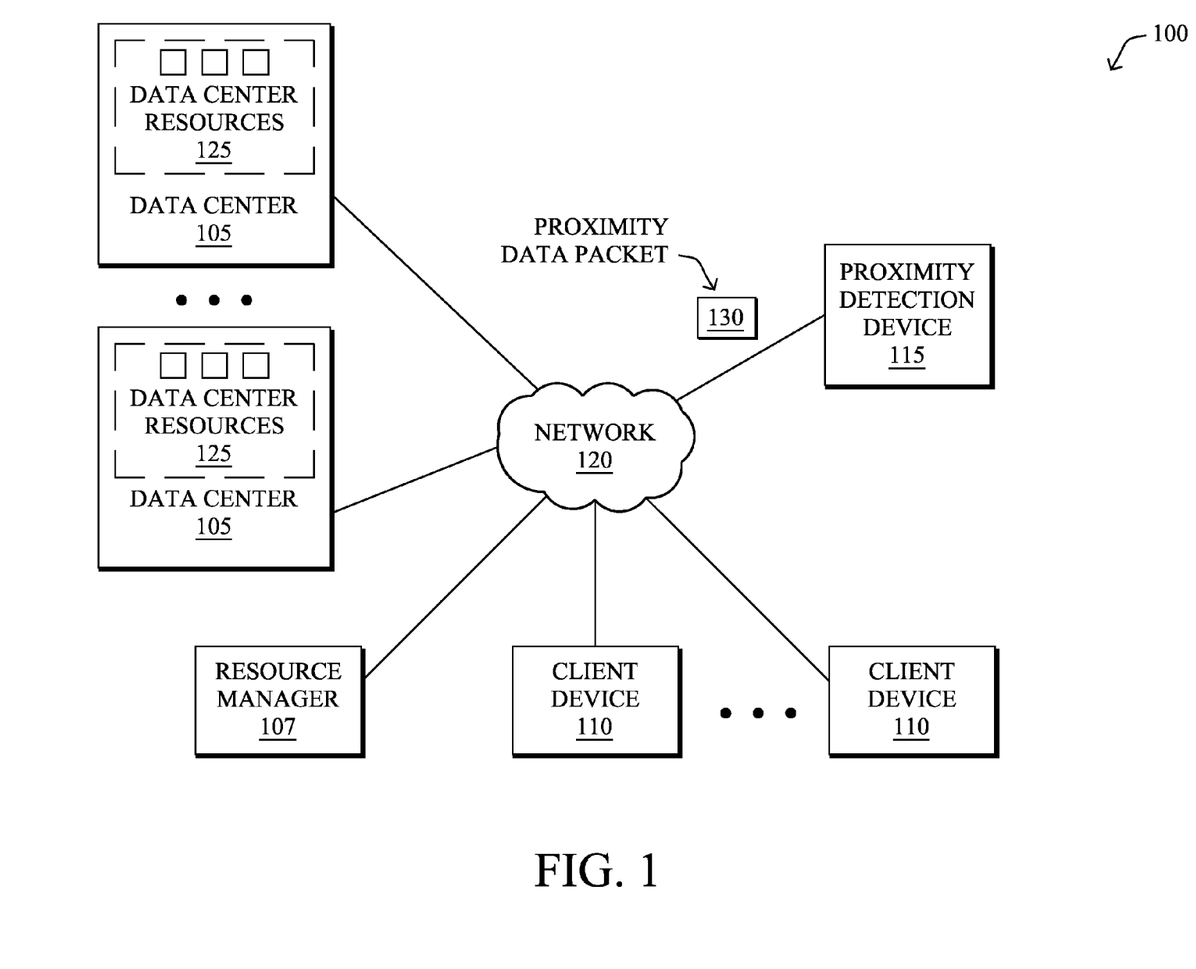
FIG. 1 illustrates an example virtual desktop environment.

FIG. 1 is a schematic block diagram of an example an illustrative virtual desktop environment 100. Environment 100 includes at least one data center 105, a resource manager (or connection broker) 107, at least one client device 110, and at least one proximity detection device 115. The data center 105 is also shown having data center resources 125, which may support one or more virtual machines (e.g., network resources, memory resources, processing resources, storage resources, etc.). That is, a virtual machine generally serves as a container for one or more data center resources that may be allocated from one or more appropriate data centers.

Each of the devices illustrated in environment 100 may be connected by a computer network 120 via various methods of communication, as will be understood by those skilled in the art. Those skilled in the art will also understand that any number of data centers, proximity detection devices, client devices, communication hardware such as routers, computers, etc. may be used in the environment 100, and that the view shown herein is for simplicity. Also, while resource manager 107 connected to the various other devices via network 120, this orientation is merely an example illustration that is not meant to limit the disclosure. For example, resource manager 107 can connect to various devices directly, or, alternatively, resource manager 107 can be included as part of processing hardware and software contained within one (or more) of the various devices.

Figure 2:
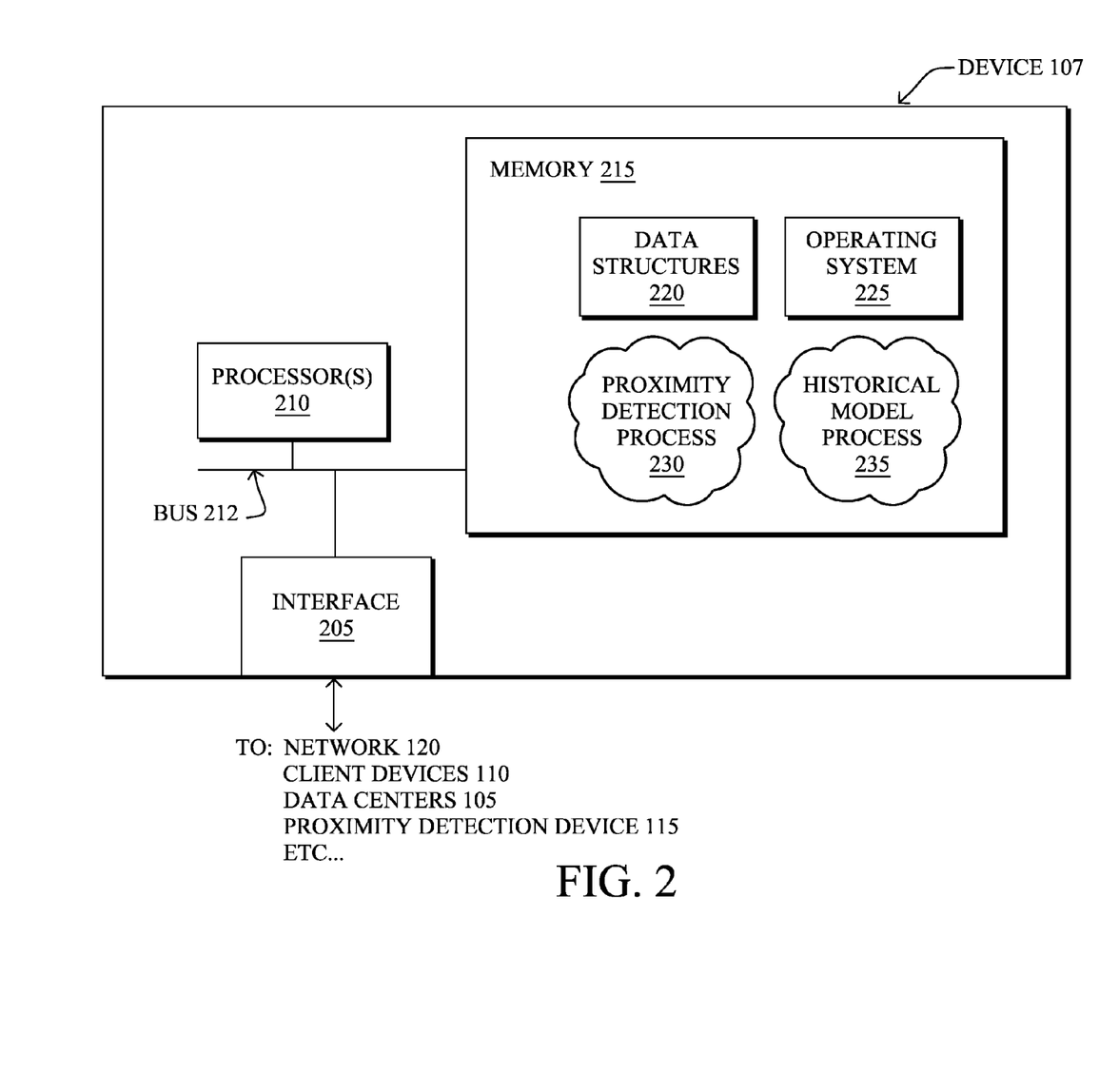
FIG. 2 illustrates an example device.

FIG. 2 is a schematic block diagram of an example network resource manager that may be used with one or more embodiments described herein (e.g., network resource manager 107 as shown in FIG. 1 above). The resource manager comprises one or more network interfaces 205, at least one processor 210, and a memory 215 interconnected by a system bus 212.

Interface(s) 205 contain the mechanical, electrical, and signaling circuitry for communicating data over network 120, or, alternatively directly to various devices illustrated in FIG. 1 above (data center 105, client device(s) 110, etc.). Accordingly, interfaces 205 may be configured to transmit and/or receive data using a variety of different communication protocols. Note, further, that the network interfaces may be configured to operate according to different types of network connections, e.g., wireless and wired/physical connections, and that the view herein is merely for illustration.

Memory 215 comprises a plurality of storage locations that are addressable by the processor 210 and interfaces 205 for storing software programs and data structures associated with the embodiments described herein. Processor 210 may comprise necessary elements or logic adapted to execute the software programs and manipulate data structures 220. An operating system 225, portions of which are typically resident in memory 220 and executed by processor 210, functionally organizes the device by, inter alia, invoking operations in support of software processes and/or services executing on the device. These software processes and/or services may comprise proximity detection process 230, and a historical model management process 235, as described herein.

Note that while the processes are indicated as already loaded into memory 215, the processes may be configured on a storage medium for subsequent loading into memory 215. The storage medium can include a computer-readable medium encoded with a computer program, and can be any conventional storage medium that stores the processes thereon in tangible form. Examples of storage media include a floppy disk, a compact disk, a magnetic tape, a read only memory, an optical storage media, universal serial bus (USB) flash drive, a digital versatile disc (DVD), etc. Alternatively, storage media can include a random access memory, or other type of electronic storage, located on a remote storage system and coupled to resource manager 107, via interface 205. As will be apparent to those skilled in the art other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, it is desirable to reduce net power consumption for a Virtual Desktop environment. Despite efforts to date, reducing net power consumption has proven problematic. In particular, for traditional virtual desktop environments, a reduction of power consumption via thin-clients or zero-clients directly correlates to an increase in power consumption in remote data centers that house the virtual machine, which is accessed by the client.

This zero sum power gain typically occurs since virtual desktop environments aspire to provide a seamless transition from traditional clients, e.g., fat-clients, to virtual machines by maintaining data resources in anticipation of a request for the virtual desktop environment and quickly providing the virtual machine in response. When data resources are not maintained, the data center first instantiates a virtual machine, and then supplies the virtual machine, e.g., a connection to the virtual machine container, in response to the request. This two-step process results in time-delays that negate the seamless transition to virtual machines.

In particular, balancing seamless transitions against power consumption has proven difficult. For example, time-of-day policies prove difficult to implement due to varying timezones of data centers housing virtual machines and clients, i.e., end-points. Further, typical policies fail to support flexible working hours that allow employees to work according to self-selected varying and flexible work hours. In addition, various consolidations and standby techniques suffer from overly complex designs that depend on external mechanisms to monitor and consolidate virtual machines within a cluster of data centers. Such designs fail to address power consumption at the data center level and further do not correlate the client with power consumption in the data center. Moreover, these designs do not provide power management as an end-to-end system, taking the state of the data center and the client into account.

For instance, traditional policies that attempt to release the virtual machine and conserve power according to a scheduled time-of-day policy based on when the virtual machine is not needed, have been difficult to implement since a time-zone of the data center housing the virtual machine varies with respect to clients. Conversely, multiple data centers can be aggregated across multiple time-zones to fulfill a single client request for a virtual machine. For example, a data center in one region of the United States may serve multiple clients all over the United States, each of which may have different time-of-day schedules according each respective time zone. Accordingly, time-of-day policies have proven difficult to implement and require intensive manual effort.

Notably, when a virtual machine is on standby, it can take about two to three minutes to "wake up" and respond to an end-user's request. Quite often, in this situation the end-user's virtual desktop request times out in about thirty to sixty seconds, thus if an end-user attempts to connect when the virtual machine is on standby, the connection may abort due to timeout, since the virtual machine is not woken up in time for the connection.

The techniques provided herein optimize power consumption for virtual desktop environments without sacrificing the seamless transition to virtual machines by detecting a presence (or absence) of an end-user. In particular, as described herein, the techniques prepare data resources, e.g., virtual machines, based on the proximity of an end-user to the client device so they are available when the end-user arrives at a client device, e.g., thin-clients or zero-clients.

Specifically, according to one or more embodiments of the disclosure as described in detail below, a system determines when an end-user is within a specified proximity of a client device configured to provide an interface to a virtual machine. In response to the end-user being within the specified proximity of the client device, the system may then allocate data center resources for the virtual machine.

Illustratively, the techniques described herein may be performed by hardware, software, and/or firmware, such as in accordance with the proximity detection process 230, and the historical model management process 235, which may contain computer executable instructions executed by the processor 210 to perform functions relating to the techniques described herein.

Operationally, under the illustrative control of proximity detection process 230, resource manager 107 determines when an end-user is within a specified proximity of a client device 110 configured to provide an interface to a virtual machine, and allocates data center resources for the virtual machine when the end-user is within the specified proximity of the client device.

Figure 3:
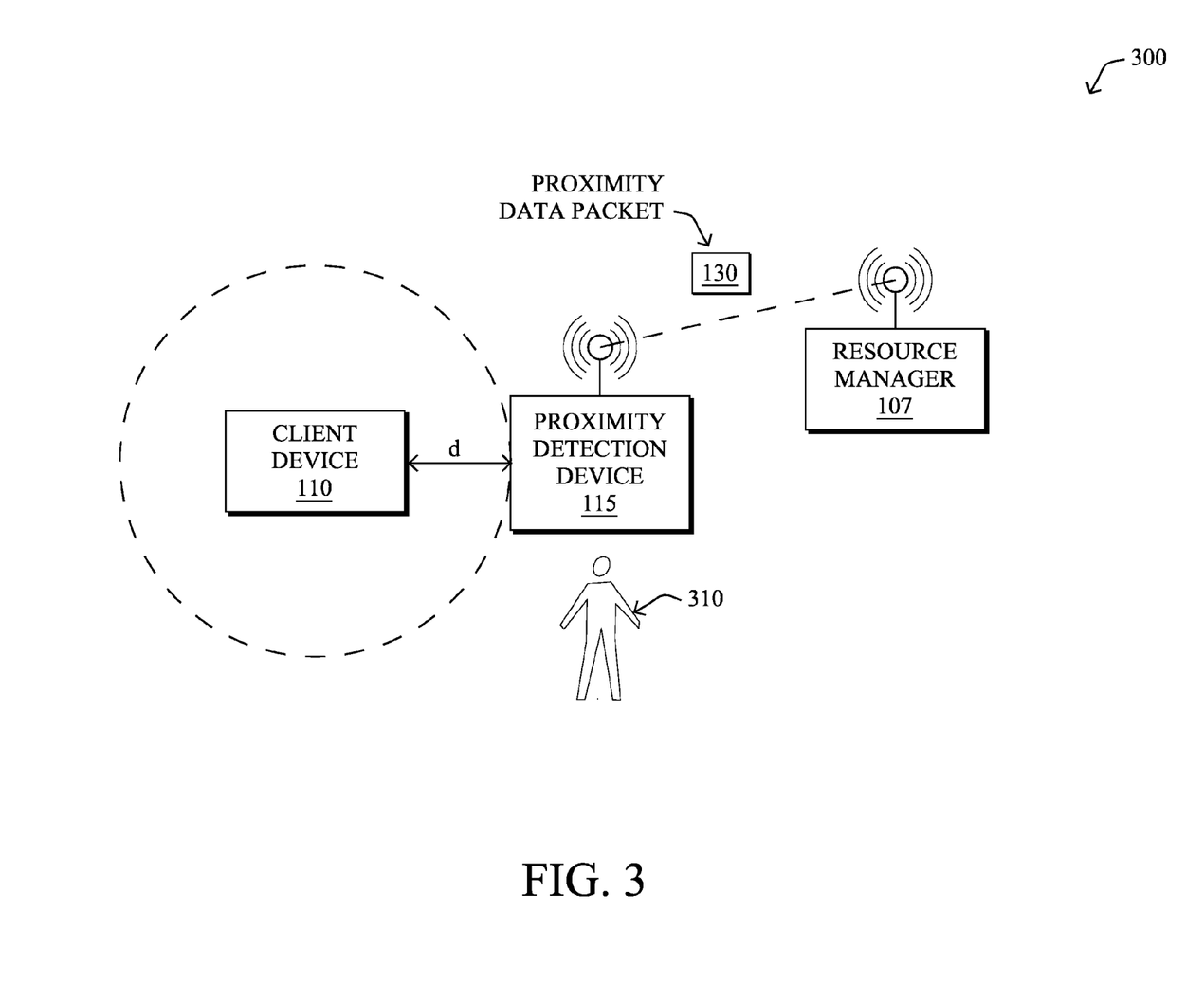
FIG. 3 illustrates an example view of detection of an end-user at a specified proximity via a proximity detecting device.

For example, FIG. 3 is an example view of detection of an end-user at proximity detection device, according to one embodiment of the present disclosure. In particular, FIG. 3 illustrates detection of an end-user 310 via proximity detection device 115 at a distance d from a client device 110. The proximity detection device 115 can detect the presence of an end-user 310 via various mechanisms. For example, the proximity detection device can detect the presence of an end-user by radio frequency identification (RFID) detection (e.g., the end-user has a badge containing an RFID tag to "badge in" at a security checkpoint to an office building or campus housing the client device), visual detection (e.g., cameras recognizing the end-user in a parking lot of a building housing the client device, a manned guard-checkpoint, etc.), global positioning system (GPS) devices (e.g., the end-user has a GPS-enabled device such as a smart-phone or vehicle), cellular communication triangulation of an end-user-device, etc.

As also illustrated in FIG. 3, the proximity detection device 115 may communicate the detection of a user via various communication technologies (wired, wireless, etc.), such as in the form of a proximity data packet 130 to resource manager 107. That is, once the proximity detection device 115 determines that one or more end-users 310 are within a specified proximity of client device 110 (where "d" represents a distance (e.g., one mile), a location (e.g., building grounds), etc.), the resource manager 107 may thus determine when the end-user is within the specified proximity, accordingly. Once the resource manager 107 determines that a particular end-user is within the specified proximity of a client device 110 (e.g., a particular client device corresponding to the particular end-user, or else one or more client devices that may be used by the particular end-user or any associated end-user), the resource manager 107 may instruct or command one or more data centers 105 to allocate one or more data center resources 125 for the end-user, illustratively, for one or more one virtual machines.

Notably, as discussed above, various configurations are contemplated by this disclosure. For example, as is appreciated by those skilled in the art, the processes discussed herein can be executed and coordinated by one or more of the described devices without requiring an independent resource manager 107. However, for purposes of simplicity, a resource manager 107 is illustrated as an independent stand-alone device.

Additionally, in one or more specific embodiments herein, the resource manager 107 may also control the power consumption of the corresponding client devices 110 by instructing or commanding the client-device to power-on or power-off in response to end-user proximity. For example, in response to determining that a particular end-user is within a specified distance of the client device (via proximity detection device 115) as discussed above, the resource manager 107 may further command a particular client device associated with the particular end-user to power-on. It is further contemplated that the resource manager may also command the client device to power-off when the end-user is outside the specified proximity of the client device in order to conserve power.

Moreover, in certain embodiments, when the end-user is outside the specified proximity from the client device, the resource manager 107 may command the data center 105 to release previously allocated data center resources. In this manner, data center resources may be re-allocated, and if not specifically re-allocated, then the previously allocated data center resources (e.g., servers) may be powered off to conserve energy. Further still, the resource manager 107 can also command the data center 105 to release the data center resources for the virtual machine after determining that the end-user logged off from the client device. Accordingly, power throughout the entire system can be conserved, while efficiently maintaining data resources for virtual machines for each client device without typical resource allocation delay (e.g., log-in delay).

In one or more specific embodiments described herein, the resource manager 107 may also identify a particular profile associated with the end-user, and may command the data center to allocate data center resources according to the profile. For example, the proximity detection device 115 may determine that a particular end-user is within a specified proximity, and notifies the resource manager 107. The resource manager 107, once notified, may then query a directory service (such as an Active Directory) to obtain the particular end-user's identification, e.g., a user log-in name. Each end-user identification may be further associated with a profile for a corresponding virtual machine (and, thereby various data resources in support thereof). In this fashion, the profile may be used to define data center resources that support a virtual machine for the particular end-user via the end-user's identification. For example, such profile-specific resources may be a particular virtual machine that corresponds to that particular end-user (e.g., for "persistent" virtual machines or desktops, as may be appreciated by those skilled in the art). Accordingly, the resource manager 107 can obtain the end-user's identification and command the data center to allocate profile-specific data center resources for the particular virtual machine.

In certain other embodiments, the end-user's identification may not be associated with a specific profile, but, instead, may be associated with a generic profile (e.g., for "non-persistent" virtual machines (or desktops). In these embodiments, the resource manager 107 can command the data center to allocate resources according to the generic profile, such as assigning a generic non-persistent virtual machine, or else "waking one up" if one is not already available. Accordingly, data resources may be allocated to support virtual machines according to end-user profiles and thereby provide a dynamic mechanism to provision virtual machines to client devices "on-demand".

Figure 4:
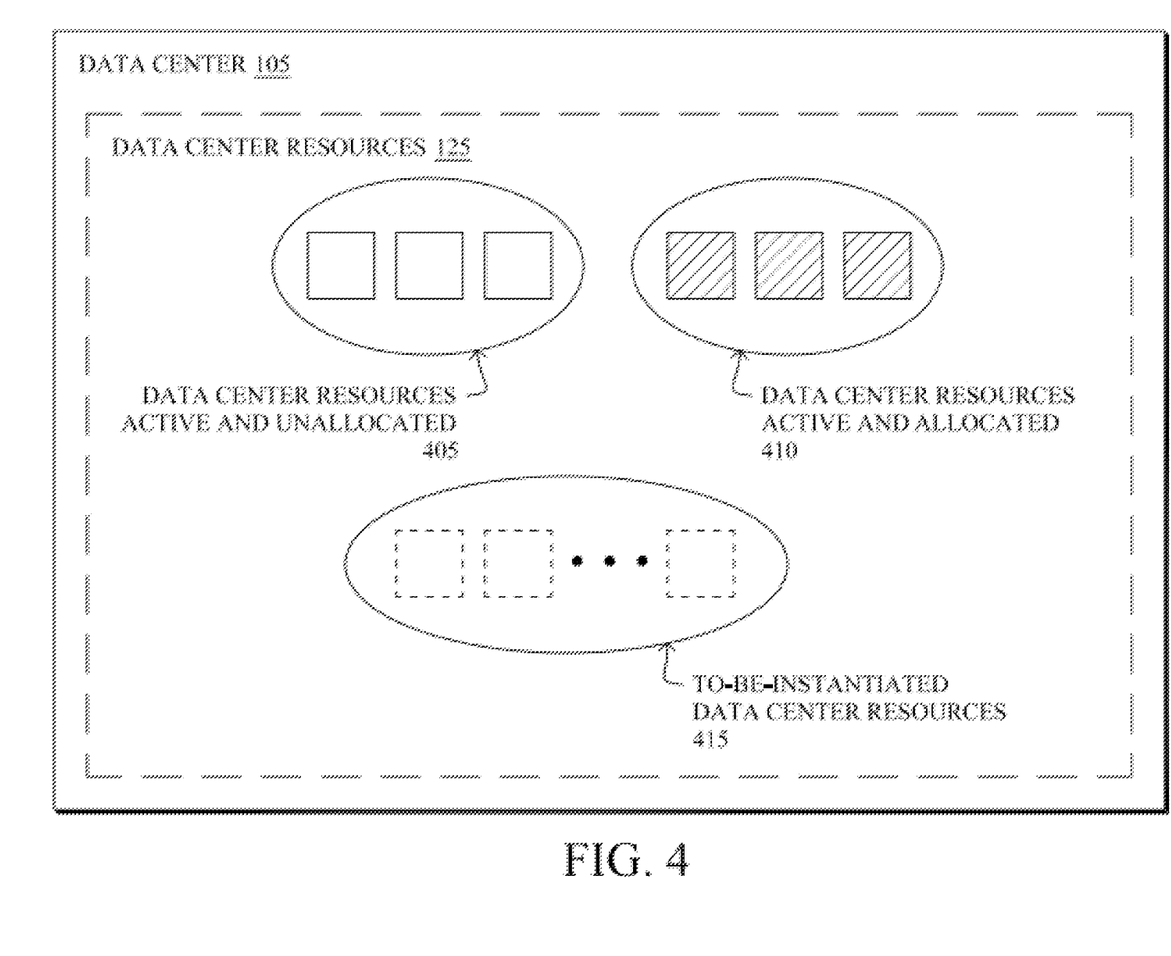
FIG. 4 illustrates an example data center having data resources for allocation.

In particular, FIG. 4 illustrates an example view of a data center 105 with data center resources 125 comprising data resources 405, 410, and 415, which may be allocated for virtual machine. Specifically, data resources 405 illustrate active and unallocated data resources, data resources 410 are active and allocated data resources, and data resources 415 are to-be-instantiated data resources. Each of these data resources 405, 410, and 415 may be allocated according to processes disclosed herein. For example, as noted above, if the resource manager 107 determines that an end-user 310 is within the specified proximity of a corresponding client device 110, the resource manager can instruct or command one or more data centers 105 to allocate one or more data center resources for the virtual machine. In certain particular embodiments, for instance, data center 105 may allocate data center resources for the virtual machine from a pool of active virtual machines, e.g., data resources 405. Further, this pool of active virtual machines can be maintained by instantiating a new virtual machine, e.g., from to-be-instantiated data center resources 415, for each instance the data center resources for the virtual machine are allocated from the pool of active virtual machines. Accordingly, once the data center allocates the active and unallocated data center resources 405, the data center resources migrate to the pool of active and allocated data center resources 410.

In some embodiments, the software processes and/or services executed by resource manager 107 may comprise a historical model management process 235. When configured to operate according to the historical model management process 235, the resource manager 107 may identify a historical model based on when one or more end-users are within the specified proximity of a corresponding client device 110, and may then allocate the data center resources for virtual machines according to the historical model. Typically, the historical model may be used to represent habits of when end-users are within proximity to a corresponding client device (e.g., comings and goings of particular end-users or end-users in general over a period of time). For example, the historical model can store one or more habitual records of when end-users are within the specified proximity of their corresponding client device for the duration of a day, a week, or some other temporal behavior. The historical model can be used to further predict future habits of the end-user(s) based on the stored habitual records. The resource manager can then allocate the data center resources of the virtual machine for specified times (e.g., 9 AM-5 PM), based on the historical model. As is appreciated by those skilled in the art, the historical model can incorporate any number of temporal end-user habits, e.g., a day, a week, a month, etc.

In this manner, the historical model allows the resource manager to efficiently maintain the pool of active unallocated data resources (e.g., data resources 405) in anticipation of end-users, so as to prevent unallocated data resources from being unnecessarily maintained. In turn, the resource manager, when allocating the data resources for the virtual machine according to the historical model, can efficiently power-on or power-off the data resources.

Notably, allocating data center resources according to the historical model may be especially important when data centers and the client devices reside in different geographic locations, or more particularly, different time-zones, even more so when a single data center provides data resources to client devices that reside in multiple time-zones. Accordingly, the historical model may be used to provide a simplified solution to complex time-zone policies by predicting each end-user's particular data resource needs and provisioning the data resources accordingly. For example, assuming two hundred users are determined to generally log in at 9 AM, greater granularity and control over resource allocation may be provided by the resource manager 107 through the historical model. In this example, one hundred end-users generally log on in New York at 9 AM, and one hundred end-users generally log on in San Francisco at 9 AM, it would be beneficial to activate/allocate one hundred virtual machines for 9 AM New York time, and activate/allocate another one hundred virtual machines for 9 AM San Francisco time, rather than simply two hundred virtual machines for 9 AM local to the corresponding data center providing those virtual machine resources.

Figure 5:
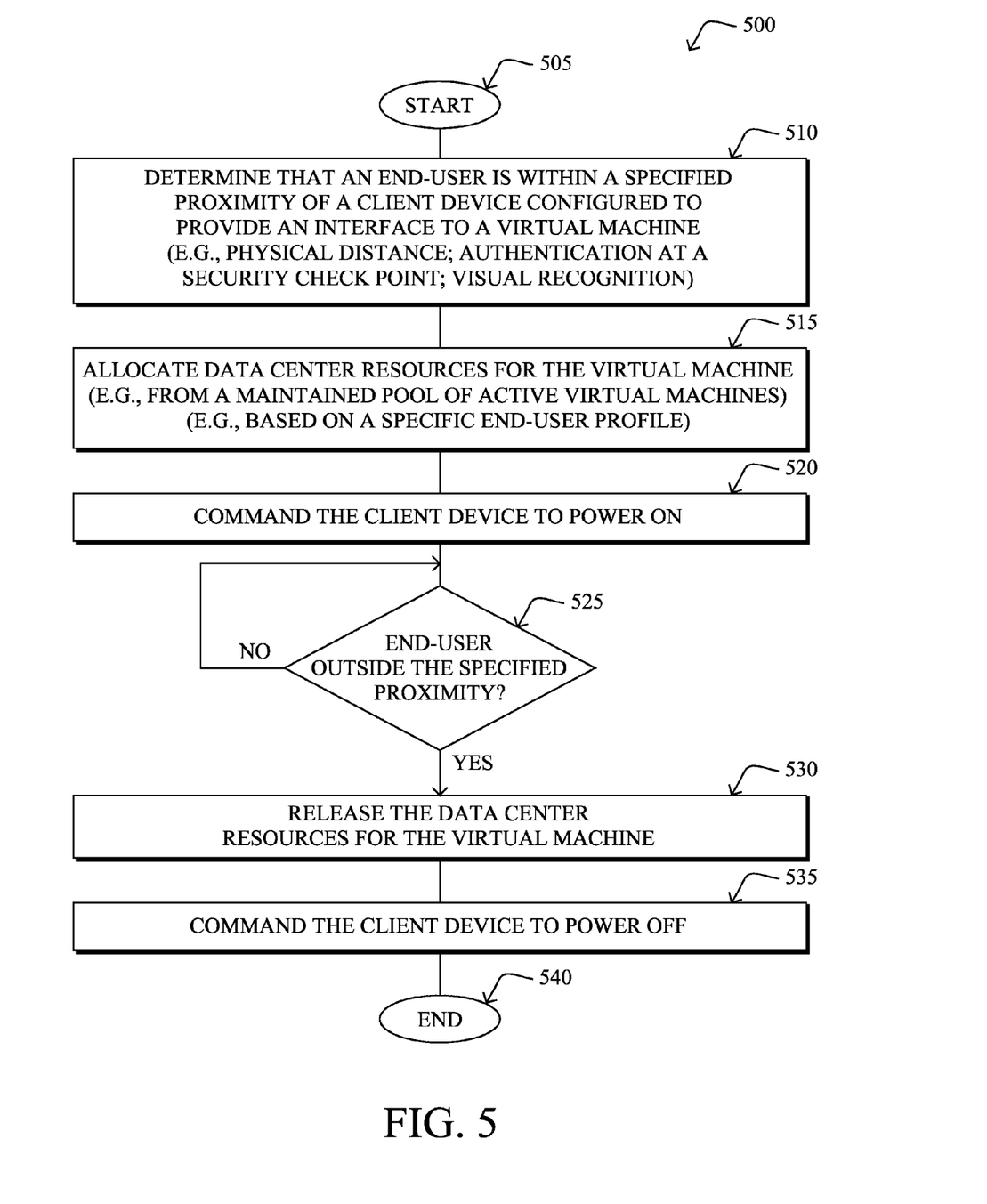
FIG. 5 illustrates an example simplified procedure for proximity-based power management and resource allocation.

FIG. 5 illustrates an example simplified procedure, i.e., procedure 500, for proximity-based power management for virtual desktop environments in accordance with one or more embodiments described herein, particularly from the perspective of the resource manager 107. Procedure 500 starts at step 505, and continues to step 510, where, as described in greater detail above, the resource manager determines that an end-user 310 is within a specified proximity (e.g., physical distance, authentication at a security checkpoint, visual recognition, etc.) of a client device configured to provide an interface to a virtual machine. In response, in step 515 the resource manager commands the data center 105 to allocate data center resources 125 for the virtual machine, for use on the associated client device 110, as describe above. As also mentioned above, the data center can allocate the data center resources from, for example, a pool of active unallocated virtual machines, or based on a profile of the end-user. In specific embodiments, in step 520 the resource manager may also command the client device to power-on. If during step 525 the resource manager detects that the end-user is subsequently located outside the specified proximity, then in step 530, the resource manager may command the data center to release the data center resources. Additionally, in one or more specific embodiments, the resource manager may also command the client device to power-off in step 535. The procedure 500 subsequently may end in step 540, or, may restart at step 505.

Figure 6:
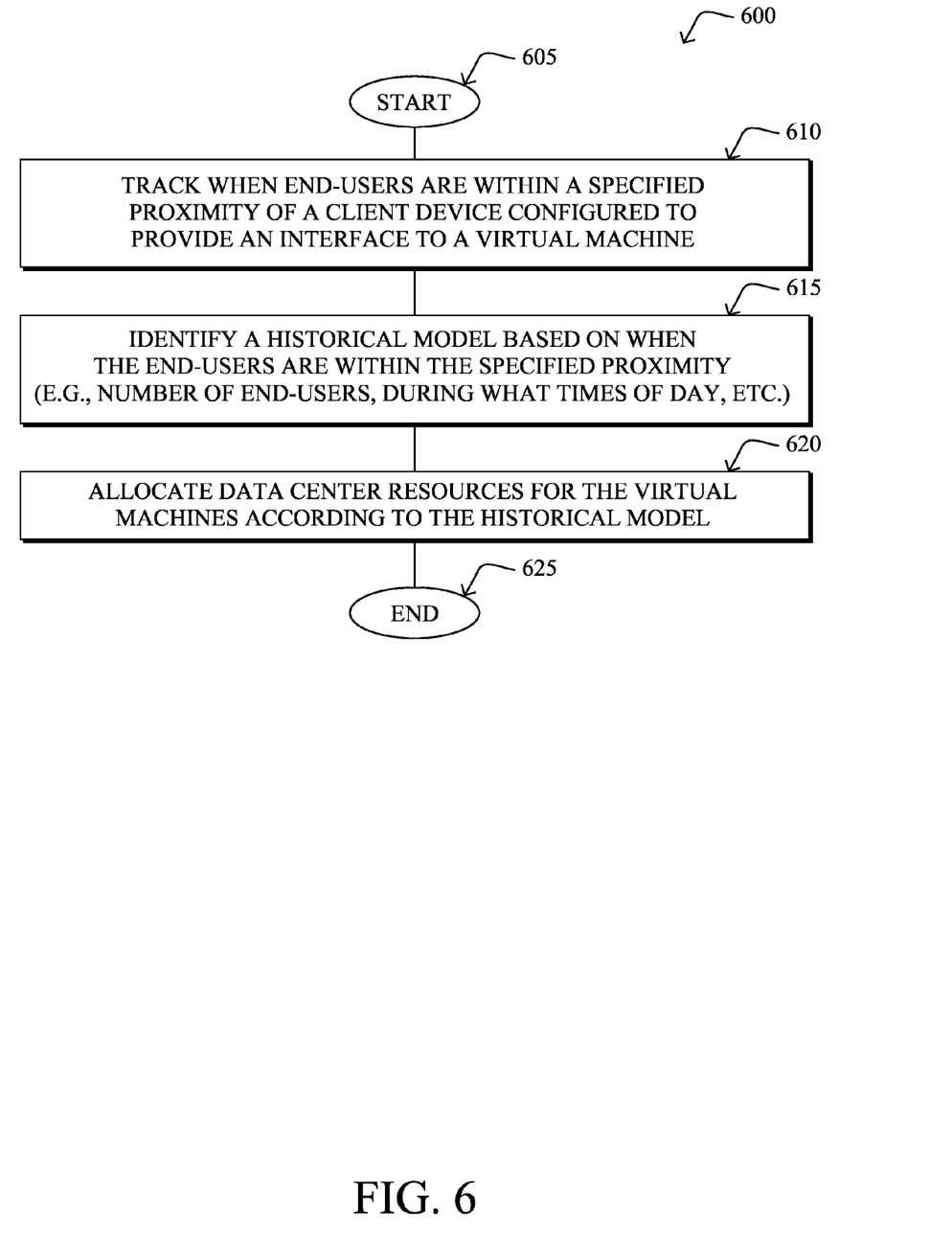
FIG. 6 illustrates an example simplified procedure for proximity-based power management according to a historical model.

In addition, FIG. 6 illustrates an example simplified procedure, i.e., procedure 600, for proximity-based power management according to a historical model in accordance with one or more embodiments described herein, particularly from the perspective of the resource manager 107. Procedure 600 starts at step 605, and continues to step 610, where, as described in greater detail above, the resource manager tracks when one or more end-users are within a specified proximity of a client device configured to provide a virtual machine. In step 615, the resource manager may identify a historical model based on when each end-user is within the specified proximity. The historical model, as discussed above, can include an aggregate number of end-users, and temporal habits such as time-periods that end-users are within the specified proximity of client devices. That is, as mentioned above, the end-user tracking may be specific to particular users, or may be a generalized tracking of end-user behavior in general (e.g., numbers of end-users versus individual behavior of particular end-users). The resource manager may then command one or more data centers to allocate data center resources for the virtual machines according to the historical model in step 620. Procedure 600 subsequently may end in step 625, or, may restart at step 605, e.g., to continue tracking end-user behavior.

It should be noted that while certain steps within procedures 500-600 may be optional as described above, the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, provide for location-based power management for virtual desktop environments. In particular, the techniques herein provide an end-to-end solution that optimizes power usage, yet maintains a seamless transition to a virtual desktop environment via a correlation between an end-user and a specified proximity to a client device. In this fashion, the virtual machines can be instantiated and/or allocated to client devices based on the dynamic need of an end-user. For instance, the techniques herein also optimize end-to-end virtual desktop power efficiencies by turning off the unneeded virtual machines resulting in virtual machine consolidation onto the least number of running hosts in the data center. Moreover, a historical model can be built based on iterative monitoring of when the end-user is within the specified proximity, and the data resources for the virtual machine can be allocated accordingly. This historical model can account for factors such as time and time-zone based policies to further balance resource loading at the data center server.

While there have been shown and described illustrative embodiments that provide for location-based power management for virtual desktop environments, it is to be understood that various other adaptations and modifications may be made within the spirit and scope of the embodiments herein. For example, the embodiments have been shown and described herein with relation to virtual desktop environments. However, the embodiments in their broader sense are not as limited, and may, in fact, be used with other types of virtual resource allocation environments (e.g., Desktop As A Service, Distributed VDI, Hosted Shared Desktops, Application Streaming etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a resource manager responsible for allocating resources at a data center for a virtual machine, an indication from a proximity detection device that an end-user is within a specified proximity of a client device remote from the data center, wherein the client device is configured to provide an interface to the virtual machine;
   in response to receiving the indication from the proximity detection device, determining, by the resource manager, that the end-user is within the specified proximity of the client device; and
   in response to the resource manager determining that the end-user is within the specified proximity of the client device, allocating, by the resource manager, the resources at the data center for the virtual machine configured to interface with the client device, wherein allocating the data center resources for the virtual machine includes:
      identifying a historical model based on when the end-user is within the specified proximity, and
      allocating the data center resources for the virtual machine according to the historical model.

2. The method of claim 1, further comprising:
   identifying a profile associated with the end-user; and
   wherein, allocating the data center resources comprises allocating the data center resources for the virtual machine according to the profile.

3. The method of claim 1, wherein the data center resources includes at a least one of network resources; storage resources; processing resources; and infrastructure resources.

4. The method of claim 1, wherein determining when the end-user is within the specified proximity comprises at least one of:
   determining a distance between the client device and the end-user;
   determining that the end-user has been authenticated at a security checkpoint associated with the client device; and
   visually recognizing the end-user at a location associated with the client device.

5. The method of claim 1, wherein the data center resources for the virtual machine are allocated from a pool of unallocated active virtual machines.

6. The method of claim 5, further comprising:
   instantiating a new unallocated active virtual machine when the data center resources for the virtual machine are allocated from the pool of unallocated active virtual machines.

7. The method of claim 1, further comprising:
   releasing the data center resources for the virtual machine when the end-user is outside the specified proximity of the client device.

8. The method of claim 1, further comprising:
   commanding the client device to power off when the end-user is outside the specified proximity of the client device.

9. An apparatus, comprising:
   one or more network interfaces adapted to communicate in a computer network;
   a processor adapted to execute one or more processes; and
   a memory configured to store a process executable by the processor, the process when executed operable to:
      receive an indication from a proximity detection device that an end-user is within a specified proximity of a client device remote from a data center, wherein the client device is configured to provide an interface to a virtual machine
      in response to receiving the indication from the proximity detection device, determining, by the resource manager, that the end-user is within the specified proximity of the client device; and
      in response to the resource manager determining that the end-user is within the specified proximity of the client device, allocate resources at the data center for the virtual machine configured to interface with the client device, wherein the process, when executed to allocate the data center resources, is operable to:
         identify a historical model based on when the end-user is within the specified proximity; and
         allocate the data center resources for the virtual machine according to the historical model,
   wherein the apparatus is a resource manager responsible for allocating the resources at the data center for the virtual machine.

10. The apparatus as in claim 9, wherein the process, when executed, is further operable to:
    identify a profile associated with the end-user; and
    allocate the data center resources for the virtual machine according to the profile.

11. The apparatus of claim 9, wherein the process is operable to determine when the end-user is within the specified proximity by performing at least one task, selected from:
    determining a distance between the client device and the end-user;
    determining that the end-user has been authenticated at a security checkpoint associated with the client device; and
    visually recognizing the end-user at a location associated with the client device.

12. The method of claim 9, wherein the data center resources for the virtual machine are allocated from a pool of active virtual machines.

13. The apparatus of claim 9, wherein the process, when executed, is further operable to:
    release the data center resources for the virtual machine when the end-user is outside the specified proximity of the client device.

14. A tangible, non-transitory, computer-readable media having software encoded thereon, the software, when executed by a processor operable to:
    receive, at a resource manager responsible for allocating resources at a data center for a virtual machine, an indication from a proximity detection device that an end-user is within a specified proximity of a client device remote from the data center, wherein the client device is configured to provide an interface to the virtual machine;
    in response to reception of the indication from the proximity detection device, determining, by the resource manager, determine, by the resource manager, that the end-user is within the specified proximity of the client device; and
    in response to the resource manager determining that the end-user is within the specified proximity of the client device, allocating, by the resource manager, the resources at the data center for the virtual machine configured to interface with the client device, wherein allocating the data center resources for the virtual machine includes:
       identifying a historical model based on when the end-user is within the specified proximity, and allocating the data center resources for the virtual machine according to the historical model.

15. The computer-readable media of claim 14, wherein the software, when executed by a processor, is further operable to:
    identify a profile associated with the end-user; and
    allocate the data center resources for the virtual machine according to the profile.

16. The computer-readable media of claim 14, wherein the software, when executed by the processor, is operable to determine when the end-user is within the specified proximity by performing at least one task selected from:
    determining a distance between the client device and the end user;
    determining that the end-user at a security checkpoint associated with the client device; and
    visually recognizing the end-user at a location associated with the client device.

17. The computer-readable media of claim 14, wherein the software, when executed by a processor, is further operable to:
    release the data center resources for the virtual machine when the end-user is outside the specified proximity of the client device.

* * * * *